US009749182B2

(12) United States Patent
Chen et al.

(10) Patent No.: US 9,749,182 B2
(45) Date of Patent: Aug. 29, 2017

(54) METHOD AND APPARATUS FOR CONFIGURING NETWORK POLICY OF VIRTUAL NETWORK

(71) Applicant: Huawei Technologies Co., Ltd., Shenzhen, Guangdong (CN)

(72) Inventors: Hao Chen, Nanjing (CN); Yingjie Gu, Nanjing (CN); Wei Song, Nanjing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 279 days.

(21) Appl. No.: 14/066,482

(22) Filed: Oct. 29, 2013

(65) Prior Publication Data

US 2014/0122672 A1 May 1, 2014

(30) Foreign Application Priority Data

Oct. 30, 2012 (CN) .......................... 2012 1 0424043

(51) Int. Cl.
*G06F 15/177* (2006.01)
*G06F 9/455* (2006.01)
*H04L 12/24* (2006.01)

(52) U.S. Cl.
CPC ...... *H04L 41/0893* (2013.01); *G06F 9/45558* (2013.01); *G06F 2009/45595* (2013.01)

(58) Field of Classification Search
CPC ............... H04L 29/06; H04L 29/08981; H04L 29/08072
USPC ......................................................... 709/221
See application file for complete search history.

(56) References Cited

U.S. PATENT DOCUMENTS

| 8,423,632 | B2 | 4/2013 | Yin et al. | |
|---|---|---|---|---|
| 2010/0054260 | A1 | 3/2010 | Pandey et al. | |
| 2012/0063363 | A1* | 3/2012 | Li | H04L 12/4645 370/255 |
| 2013/0061225 | A1* | 3/2013 | Nakagawa | 718/1 |
| 2014/0359620 | A1* | 12/2014 | Van Kerkwyk | H04L 41/042 718/1 |

FOREIGN PATENT DOCUMENTS

| CN | 102136931 A | 7/2011 |
|---|---|---|
| EP | 2431883 A2 | 3/2012 |
| EP | 2725737 A1 | 4/2014 |
| WO | 2009146165 A1 | 12/2009 |
| WO | 2012109868 A1 | 8/2012 |

* cited by examiner

*Primary Examiner* — Alan S Chou
(74) *Attorney, Agent, or Firm* — Leydig, Voit & Mayer, Ltd.

(57) ABSTRACT

The present invention discloses a method and an apparatus for configuring a network policy of a virtual network. The method includes: receiving, by a server, a network policy message sent by a virtual machine management center and used for creating a virtual network, where the network policy message for creating a virtual network includes a virtual network identification (VNID) of a virtual network to be created and network policy configuration information corresponding to the virtual network to be created; and sending, by the server, a network policy synchronization message to a network device, where the network policy synchronization message includes the VNID of the virtual network to be created and the network policy configuration information corresponding to the virtual network to be created. Consequently, processing overheads can be reduced.

13 Claims, 9 Drawing Sheets

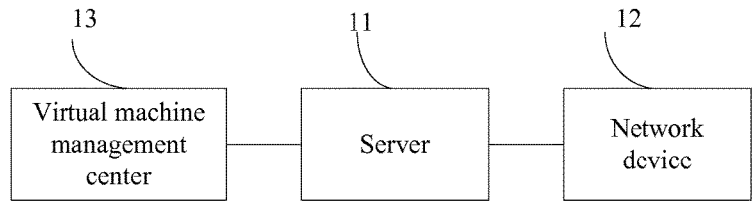

FIG. 10

| Type length value type TLV Type =0x6 (7-bit) | TLV length TLV length (9bits) | Virtual server instance type identifier VSI Type ID (24bit) | VSI type version VSI Type Version (8bit) | Number of entries Number of Entries | Policy type Policy type | Policy information Policy Info |

FIG. 11

| TLV type (TLV type) | Value Value |
|---|---|
| Pre-Associate Pre-Associate | 0X01 |
| Pre-Associate with resource reservation Pre-Associate with resource reservation | 0X02 |
| Associate Associate | 0X03 |
| De-associate De-associate | 0X04 |
| VSI manager ID VSI manager ID | 0X05 |
| Organizationally defined TLV Organizationally defined TLV | 0X7F |
| Reserved for future standardization Reserved for future standardization | 0x00 0x09-0x7E |
| Network policy synchronization Policy Sync | 0x06 |
| Network policy update Policy Update | 0x07 |
| Network policy removal Policy Remove | 0x08 |

FIG. 12

| Policy type Policy type | Value Value |
|---|---|
| No network policy None Policy | 0x00 |
| Bandwidth Bandwidth | 0x01 |
| Access control list ACL | 0x02 |
| Quality of service QoS | 0x03 |
| Virtual network policy VN Policy | 0x06 |
| Reserved Reserved | 0x07-0x7F |
| DHCP(Dynamic Host Configuration Protocol, Dynamic Host Configuration Protocol) snooping | 0x05 |
| IGMP (Internet Group Management Protocol, Internet Group Management Protocol) snooping | 0x06 |

FIG. 13

METHOD AND APPARATUS FOR CONFIGURING NETWORK POLICY OF VIRTUAL NETWORK

CROSS-REFERENCE TO RELATED APPLICATION

This application claims priority to Chinese Patent Application No. 201210424043.3, filed on Oct. 30, 2012, which is hereby incorporated by reference in its entirety.

TECHNICAL FIELD

Embodiments of the present invention relate to the field of communication technologies, and in particular, to a method and an apparatus for configuring a network policy of a virtual network.

BACKGROUND

With the introduction of a virtualization technology, a virtual machine (VM) may be dynamically created on and removed from a server or migrated between servers.

Generally, a user may create multiple VMs on a server; because the multiple VMs belong to the same user, the user may set general network policies corresponding to the multiple VMs and a personalized network policy, where the general network policies are the same for each VM created by the same user, for example, the multiple VMs belonging to the same user jointly comply with a group of access control list (ACL) policies.

However, according to the conventional method, in the case that a user has created a VM on the server, if the user wants to create a new VM on the same server, the server also needs to send network policy configuration information (including general network policy configuration information and personalized network policy configuration information) related to the newly created VM to a network device that communicates with the newly created VM, so that the network device configures a corresponding network policy for the newly created VM according to the network policy configuration information related to the newly created VM. Therefore, processing overheads are increased.

SUMMARY

The present invention provides a method and an apparatus for configuring a network policy of a virtual network, which can reduce processing overheads.

According to a first aspect, the present invention provides a method for configuring a network policy of a virtual network, where the method includes:

receiving, by a server, a network policy message sent by a virtual machine management center and used for creating a virtual network, where the network policy message for creating a virtual network includes a virtual network identification VNID of a virtual network to be created and network policy configuration information corresponding to the virtual network to be created; and sending, by the server, a network policy synchronization message to a network device, where the network policy synchronization message includes the VNID of the virtual network to be created and the network policy configuration information corresponding to the virtual network to be created.

According to a second aspect, the present invention provides a method for configuring a network policy of a virtual network, where the method includes:

receiving, by a network device, a network policy synchronization message sent by a server, where the network policy synchronization message includes a VNID of a virtual network to be created and network policy configuration information corresponding to the virtual network to be created; and creating, by the network device, a mapping relationship between the VNID and the network policy configuration information on a basis that adaptability of the network policy configuration information is verified successfully.

According to a third aspect, the present invention provides an apparatus for configuring a network policy of a virtual network, where the apparatus includes:

a receiving module, configured to receive a network policy message sent by a virtual machine management center and used for creating a virtual network, where the network policy message for creating a virtual network includes a virtual network identification VNID of a virtual network to be created and network policy configuration information corresponding to the virtual network to be created; and a sending module, configured to send a network policy synchronization message to a network device, where the network policy synchronization message includes the VNID of the virtual network to be created and the network policy configuration information corresponding to the virtual network to be created.

According to a fourth aspect, the present invention provides an apparatus for configuring a network policy of a virtual network, where the apparatus includes:

a receiving module, configured to receive a network policy synchronization message sent by a server, where the network policy synchronization message includes a VNID of a virtual network to be created and network policy configuration information corresponding to the virtual network to be created; and a creating module, configured to create a mapping relationship between the VNID and the network policy configuration information on a basis that adaptability of the network policy configuration information is verified successfully.

In the present invention, a server receives a network policy message sent by a virtual machine management center and used for creating a virtual network, where the network policy message for creating a virtual network includes a virtual network identification VNID of a virtual network to be created and network policy configuration information corresponding to the virtual network to be created; the server sends a network policy synchronization message to a network device, where the network policy synchronization message includes the VNID of the virtual network to be created and the network policy configuration information corresponding to the virtual network to be created, so that the network device creates a mapping relationship between the VNID of the virtual network to be created and the network policy configuration information. Therefore, when there are multiple virtual machines having a same VNID, it is unnecessary to send the network policy configuration information corresponding to the VNID repeatedly to the network device for configuration, and processing overheads of the system can be reduced.

BRIEF DESCRIPTION OF DRAWINGS

To illustrate the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

FIG. 10 is a schematic structural diagram of a system for configuring a network policy of a virtual network according to another embodiment of the present invention;

FIG. 11 is a schematic diagram of a message format of a new VDP applied in an embodiment of the present invention;

FIG. 12 is a schematic diagram of a mapping relationship between a TLV type and a corresponding Value value in the message format of the VDP shown in FIG. 11; and FIG. 13 is a schematic diagram of a mapping relationship between a policy type Policy Type and a Value value of a corresponding TLV Type shown in FIG. 11.

DESCRIPTION OF EMBODIMENTS

To make the objectives, technical solutions, and advantages of the embodiments of the present invention more comprehensible, the following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

Figure 1:
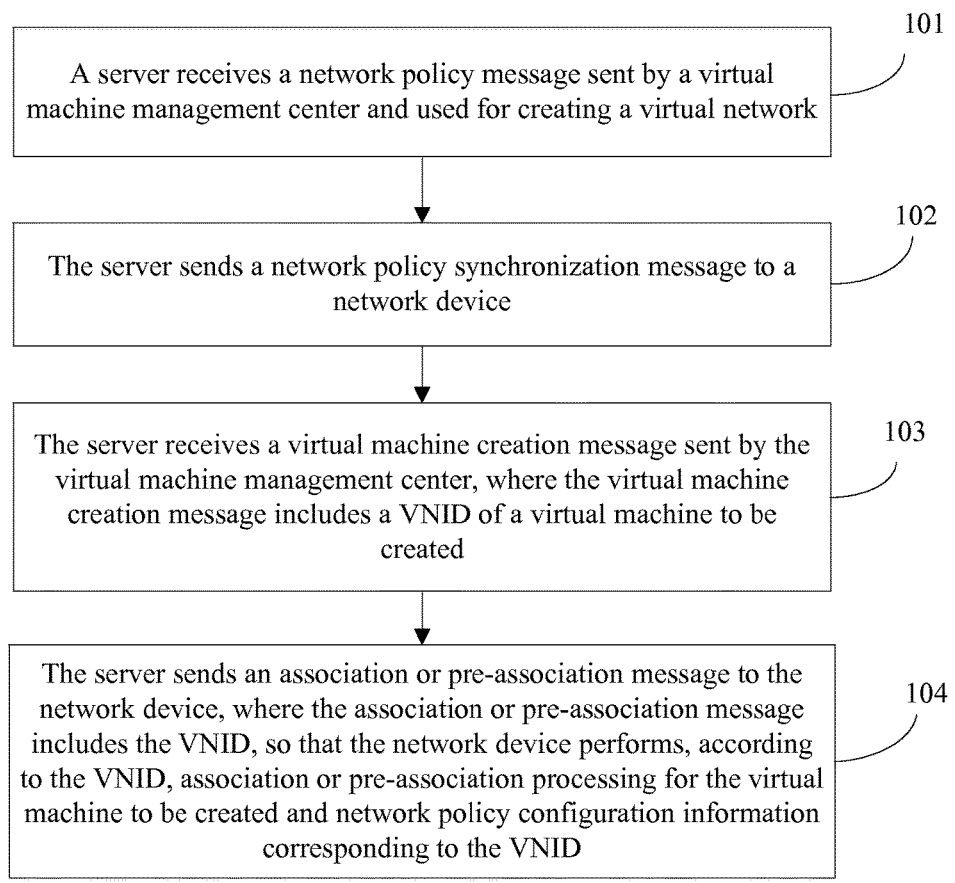
FIG. 1 is a schematic flowchart of a method for configuring a network policy of a virtual network according to an embodiment of the present invention.

FIG. 1 is a schematic flowchart of a method for configuring a network policy of a virtual network according to an embodiment of the present invention. As shown in FIG. 1, the method for configuring a network policy of a virtual network in this embodiment may include the following:

101. A server receives a network policy message sent by a virtual machine management center and used for creating a virtual network.

The network policy message for creating a virtual network includes a virtual network identification VNID of a virtual network to be created and network policy configuration information corresponding to the virtual network to be created.

102. The server sends a network policy synchronization message to a network device.

The network policy synchronization message includes the VNID of the virtual network to be created and the network policy configuration information corresponding to the virtual network to be created.

The network policy is a permission that specifies whether a specific user or a group of users authorized to use a virtual machine can access all or a specific part of the network and use network resources. For example, users in the above group of users are users belonging to a same virtual local area network (VLAN).

The network policy configuration information is used for the network device to create a network policy corresponding to the VNID; for example, the network policy configuration information is used for the network device to configure configuration information of an access control list (ACL), quality of service (QoS), or a combination thereof for the virtual machine corresponding to the VNID; the network policy configuration information may also be intrusion protection (IPS) security policy information and intrusion detection IDS (IDS) security policy information.

Correspondingly, after receiving the network policy synchronization message sent by the server, the network device may verify adaptability of the network policy configuration information of the virtual network to be created, and if the verification succeeds, create a mapping relationship between the VNID of the virtual network to be created and the network policy configuration information corresponding to the virtual network to be created. For example, the network device may create a network policy list corresponding to the VNID, and add the network configuration information of the virtual network to be created to the created network policy list corresponding to the VNID.

The network policy synchronization message includes, for example, a Pre-Associate message or an Associate message in a new VDP protocol or a Flow Specification (Flow Specification) message in a new BGP protocol, and so on.

103. The server receives a virtual machine creation message sent by the virtual machine management center, where the virtual machine creation message includes a VNID of a virtual machine to be created.

In an implementation of the present invention, when it is necessary to create a virtual machine on the server, the virtual machine management center vCenter sends a message to the server, for instructing the server to create a virtual machine, where the message for instructing the server to create a virtual machine is referred to as a virtual machine creation message below. The virtual machine creation message includes a virtual network identification (VNID) of a virtual machine to be created, where the VNID of the virtual machine is used to indicate a virtual network identification of a user to which the virtual machine belongs; generally, when a same user creates multiple virtual machines on a same server, VNIDs of the multiple virtual machines are the same. Specifically, the virtual machine management center vCenter may send the virtual machine creation message to the server through an application programming interface (API).

To distinguish multiple virtual machines created by the same user on the same server, for example, the virtual machine management center vCenter may further send a virtual machine address (VM address) of the virtual machine to be created to the server through the API interface, where the VM address may be a network layer address, such as an Internet Protocol version 4 (IPv4) address or an Internet Protocol version 6 (IPv6) address, or may also be a data link layer address such as a media access control (MAC) address.

The server may create a corresponding virtual machine locally according to the received virtual machine creation message.

104. The server sends an association or pre-association message to the network device, where the association or pre-association message includes the VNID, so that the network device performs, according to the VNID, association or pre-association processing for the virtual machine to be created and network policy configuration information corresponding to the VNID.

The association (association) or pre-association (pre-association) message is used to instruct the network device to associate, according to the VNID of the virtual machine to be created, the virtual machine to be created with network policy configuration corresponding to the VNID. In a specific implementation, the network device, for example, may query, according to the VNID of the virtual machine to be created, whether a network policy list corresponding to the VNID exists locally; if the network policy list exists, the network may add, according to the pre-association message, an identifier of the virtual machine to be created to the network policy list corresponding to the VNID. In this case, the mapping relationship between the virtual machine to be created and the network policy configuration is in a disabled state. Alternatively, the network device may add, according to the association message, the identifier of the virtual machine to be created to the network policy list corresponding to the VNID, and enable the mapping relationship between the virtual machine to be created and the network policy configuration.

For example, the association or pre-association message is specifically a Pre-Associate (Pre-Associate) message or an Associate (Associate) message in the new Virtual Station Instant Discovery and Configuration Protocol (VDP), or the association or pre-association message is specifically a Flow Specification (Flow Specification) message in the new Border Gateway Protocol (BGP).

The network device in this embodiment is a network device communicatively connected to the virtual machine that belongs to the same virtual network, for example, a network device processing a message sent from or to a virtual machine that belongs to the same virtual network. The network device may be a network switch or a router.

In the present invention, a server receives a network policy message sent by a virtual machine management center and used for creating a virtual network, where the network policy message for creating a virtual network includes a virtual network identification VNID of a virtual network to be created and network policy configuration information corresponding to the virtual network to be created; the server sends a network policy synchronization message to a network device, where the network policy synchronization message includes the VNID of the virtual network to be created and the network policy configuration information corresponding to the virtual network to be created, so that the network device creates a mapping relationship between the VNID of the virtual network to be created and the network policy configuration information.

Therefore, when there are multiple virtual machines having a same VNID, it is unnecessary to send the network policy configuration information corresponding to the VNID repeatedly to the network device for configuration, and the server only needs to send an association or pre-association message to the network device, where the association or pre-association message includes a VNID of a virtual machine to be created, so that the network device performs association or pre-association processing for the virtual machine to be created and network policy configuration information corresponding to the VNID. Consequently, processing overheads of the system can be reduced.

Meanwhile, in this embodiment, the network device may also implement network policy configuration of the virtual machine VM without using a third-party device, for example, an nCenter and a vCenter, which not only simplifies the network architecture of the system, but also solves the problem of low network policy configuration efficiency caused by poor real-time performance of network policy configuration in the prior art, and improves network policy configuration efficiency.

Figure 2:
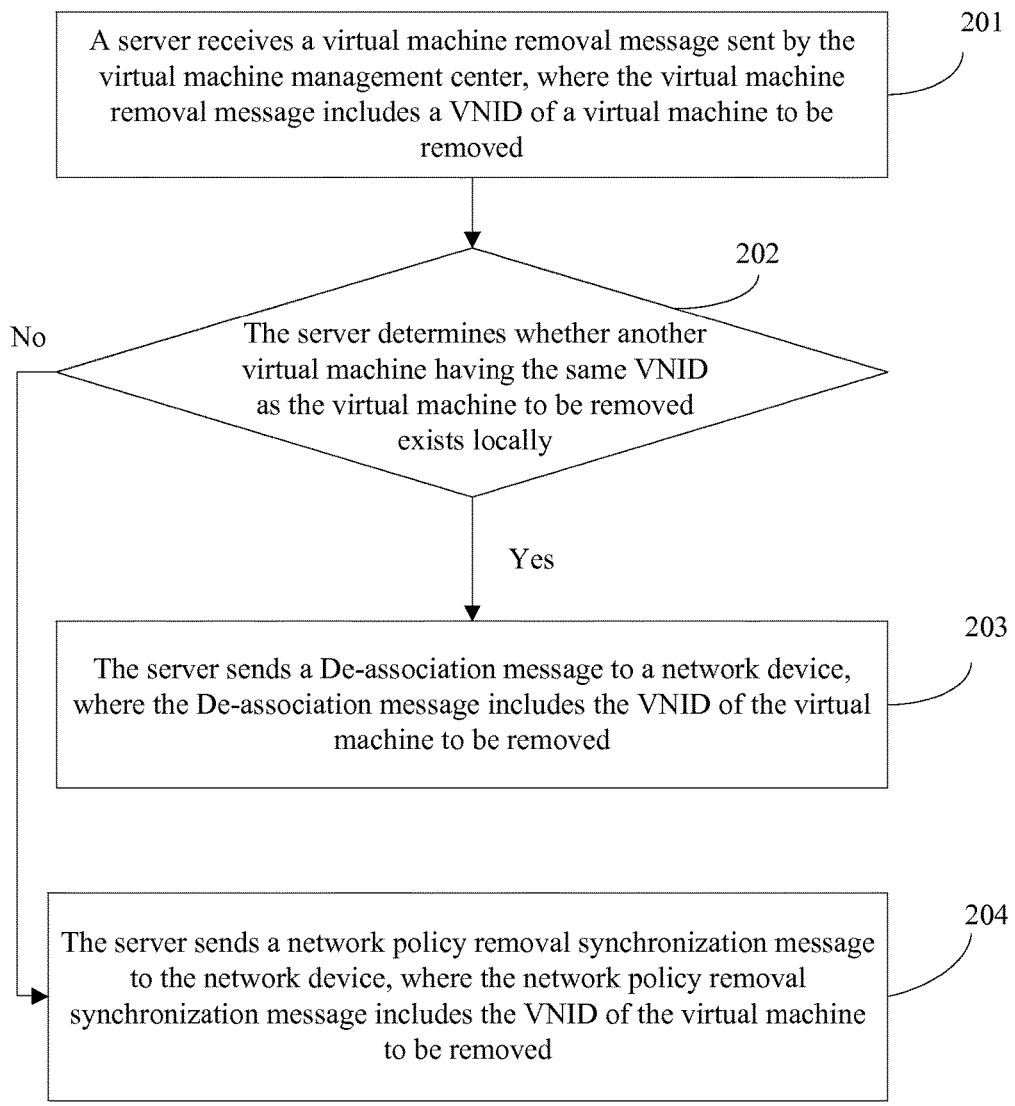
FIG. 2 is a schematic flowchart of a method for configuring a network policy of a virtual network according to another embodiment of the present invention.

FIG. 2 is a schematic flowchart of a method for configuring a network policy of a virtual network according to another embodiment of the present invention. On the basis of configuring a network policy for a newly created virtual machine in a network device by using the method of the embodiment shown in FIG. 1, when a virtual machine management center wants to remove a virtual machine created on a server, where a specific implementation process is shown in FIG. 2, the method for configuring a network policy of a virtual network in this embodiment further includes the following:

201. The server receives a virtual machine removal message sent by the virtual machine management center, where the virtual machine removal message includes a VNID of a virtual machine to be removed.

In an implementation of the present invention, when it is necessary to remove a virtual machine VM from the server, the virtual machine management center vCenter sends a message to the server, for instructing the server to remove the virtual machine, where the message for instructing the server to remove the virtual machine is referred to as a virtual machine removal message below. Specifically, the virtual machine management center vCenter sends the virtual machine removal message to the server through an application programming interface API.

The virtual machine removal message includes at least a VNID of the virtual machine to be removed. For example, the virtual machine removal message further includes a VM address of the virtual machine to be removed; according to the VM address of the virtual machine to be removed, the server removes corresponding information related to the virtual machine.

202. The server determines whether another virtual machine having the same VNID as the virtual machine to be removed exists locally; and if determining that another virtual machine having the same VNID as the virtual machine to be removed exists locally, executes step 203; or if determining that no other virtual machine having the same VNID as the virtual machine to be removed exists locally, executes step 204.

203. The server sends a De-association message to a network device, where the De-association message includes the VNID of the virtual machine to be removed.

The De-association (De-association) message is a message for instructing the network device to perform de-association processing for the virtual machine to be removed and the network policy configuration information corresponding to the VNID. For example, the De-association message specifically includes a De-associate (De-associate) message in a new VDP protocol or a Flow Specification (Flow Specification) message in a new BGP protocol, and so on.

In a specific implementation, for example, the network device may determine, according to the VNID of the virtual machine to be removed, whether a network policy list corresponding to the VNID exists locally on the network device, and if the network policy list exists, remove the virtual machine to be removed, from the network policy list corresponding to the VNID. In this case, the network device does not need to remove the network policy list corresponding to the VNID.

204. The server sends a network policy removal synchronization message to the network device, where the network policy removal synchronization message includes the VNID of the virtual machine to be removed.

The network policy removal synchronization message includes, for example, a Pre-Associate message or an Associate message in the new VDP protocol or a Flow Specification (Flow Specification) message in the new BGP protocol, and so on.

In a specific implementation, for example, the network device may determine, according to the received network policy removal synchronization message, whether a network policy list corresponding to the VNID exists locally on the network device; and if the network policy list exists, remove the network policy list corresponding to the VNID and/or multicast address information corresponding to the VNID.

In the embodiment of the present invention, when a server receives a virtual machine removal message sent by a virtual machine management center and determines, according to a VNID of a virtual machine to be removed, that another virtual machine having the same VNID as the virtual machine to be removed exists locally, the server sends a De-association message to a network device communicating with the virtual machine, where the De-association message includes the VNID of the virtual machine to be removed, so that the network device performs de-association processing for the virtual machine to be removed and a network policy corresponding to the VNID. Therefore, the configured network policy configuration of the virtual machine VM can also be removed without using a third-party device, for example, an nCenter and a vCenter, which not only simplifies the network architecture of the system, but also solves the problem of low network policy configuration efficiency caused by poor real-time performance of network policy configuration in the prior art, and improves network policy configuration efficiency.

Figure 3:
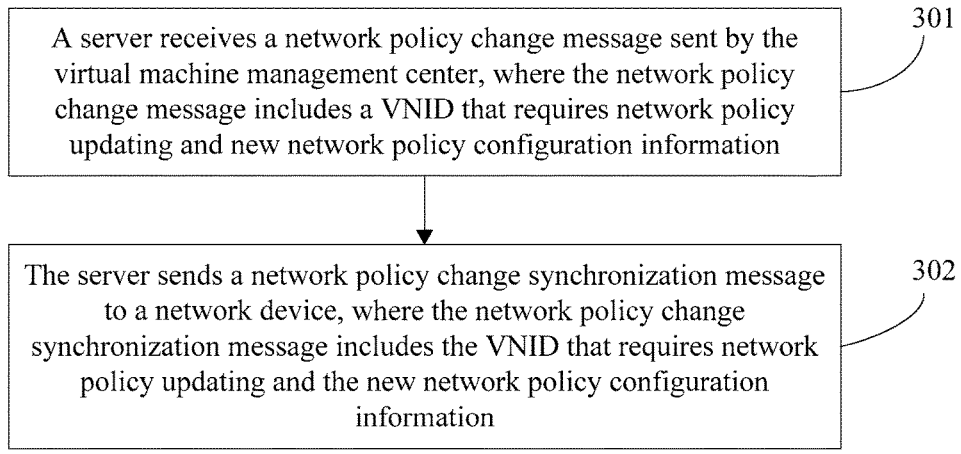
FIG. 3 is a schematic flowchart of a method for configuring a network policy of a virtual network according to another embodiment of the present invention.

FIG. 3 is a schematic flowchart of a method for configuring a network policy of a virtual network according to another embodiment of the present invention. On the basis of configuring a network policy for a newly created virtual machine in a network device by using the method of the embodiment shown in FIG. 1, when a virtual machine management center wants to change network policy configuration of the virtual machine, it is necessary to update network policy configuration information related to the virtual machine, where a specific implementation process is shown in FIG. 3, and the method for configuring a network policy of a virtual network in this embodiment further includes the following:

301. A server receives a network policy change message sent by the virtual machine management center, where the network policy change message includes a VNID that requires network policy updating and new network policy configuration information.

It is assumed that the network running environment changes or that the quality of service or bandwidth of the virtual machine needs to be changed, for example, the virtual machine currently has no permission to access an external network, and the virtual machine management center vCenter sets an access permission for the virtual machine to access the external network, or for another example, the current network bandwidth of the virtual machine is 50M, and the virtual machine management center vCenter sets the network bandwidth of the virtual machine to 100M. In this case, it is necessary to modify the network policy configuration information of the virtual machine correspondingly. In a specific implementation, the virtual machine management center vCenter sends a message to the server, for instructing the server to update the network policy of the virtual machine, where the message for instructing the server to update the network policy of the virtual machine is referred to as a network policy change message below. Specifically, the virtual machine management center vCenter sends the network policy change message to the server through an application programming interface API.

302. The server sends a network policy change synchronization message to the network device, where the network policy change synchronization message includes the VNID that requires network policy updating and the new network policy configuration information.

The network policy change synchronization message is a message for instructing the network device to update, according to the network policy configuration information to be updated, a network policy corresponding to the VNID. For example, the network policy change synchronization message includes a Pre-Associate message or an Associate message in a new VDP protocol or a Flow Specification (Flow Specification) message in a new BGP protocol, and so on.

In an implementation of the present invention, after receiving the network policy change synchronization message, if the network device determines, according to the VNID that requires network policy updating, that a network policy list corresponding to the VNID exists locally, the network device updates, according to new network policy configuration information, network policy configuration information in the local network policy list corresponding to the VNID.

In the embodiment of the present invention, when a server receives a network policy change message sent by a virtual machine management center, the server sends a network policy change synchronization message to a network device, where the network policy change synchronization message includes a VNID that requires network policy updating and new network policy configuration information, so that the network device updates network policy configuration information in a local network policy list corresponding to the VNID. Therefore, when there are multiple virtual machines having a same VNID, the network device does not need to repeatedly update a network policy corresponding to each virtual machine, and processing overheads of the system can be reduced.

Meanwhile, in this embodiment, the network device may update the network policy of the virtual machine without using a third-party device, for example, an nCenter and a vCenter, which not only simplifies the network architecture of the system, but also solves the problem of low network policy configuration efficiency caused by poor real-time performance of network policy configuration in the prior art, and improves network policy configuration efficiency.

Figure 4:
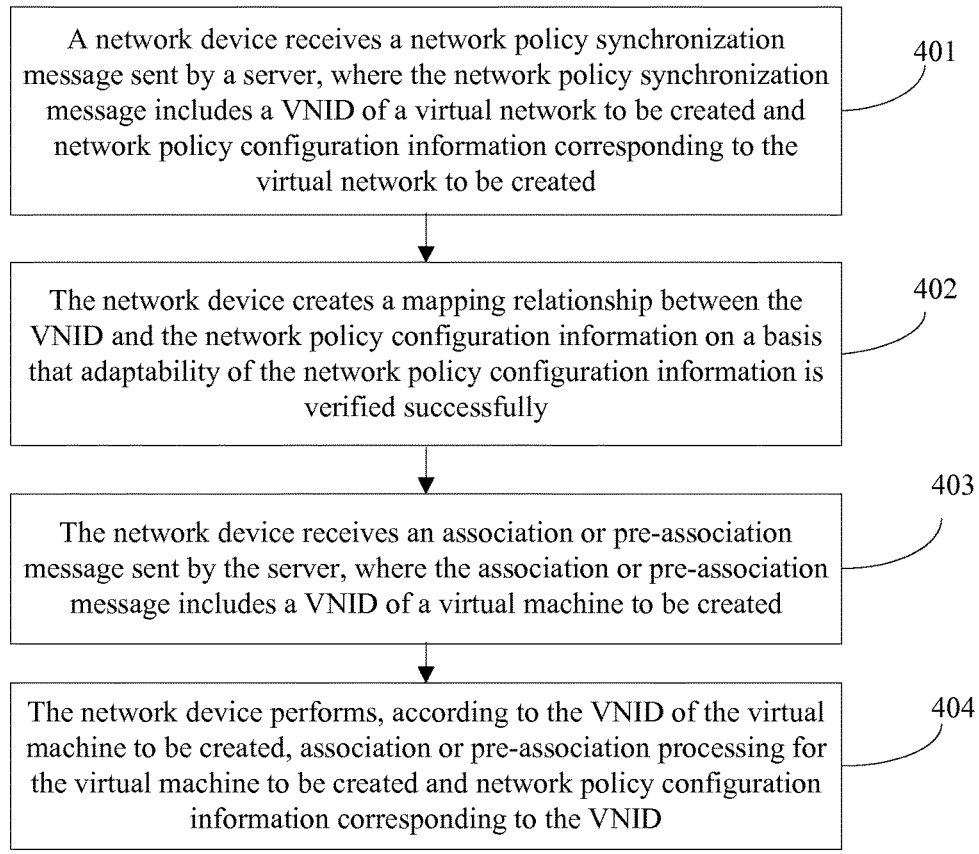
FIG. 4 is a schematic flowchart of a method for configuring a network policy of a virtual network according to another embodiment of the present invention.

FIG. 4 is a schematic flowchart of a method for configuring a network policy of a virtual network according to another embodiment of the present invention. As shown in FIG. 4, the method for configuring a network policy of a virtual network in this embodiment includes the following:

401. A network device receives a network policy synchronization message sent by a server, where the network policy synchronization message includes a VNID of a virtual network to be created and network policy configuration information corresponding to the virtual network to be created.

The network policy is a permission that specifies whether a specific user or a group of users authorized to use a virtual machine can access all or a specific part of the network and use network resources. For example, users in the above group of users are users belonging to a same virtual local area network (VLAN).

The network policy configuration information is used for the network device to create a network policy corresponding to the VNID; for example, the network policy configuration information is used for the network device to configure configuration information of an access control list (ACL), quality of service (QoS), or a combination thereof for the virtual machine corresponding to the VNID; the network policy configuration information may also be intrusion protection (IPS) security policy information and intrusion detection IDS (IDS) security policy information.

For example, the network policy synchronization message specifically includes a De-associate (De-associate) message in a new VDP protocol or a Flow Specification (Flow Specification) message in a new BGP protocol, and so on.

402. The network device creates a mapping relationship between the VNID and the network policy configuration information on a basis that adaptability of the network policy configuration information is verified successfully.

With respect to verification of adaptability of the network policy configuration information, for example, the network device may verify whether an attribute of the network policy configuration information of the virtual network to be created conflicts with the original configuration of the network device; if the attribute of the network policy configuration information of the virtual network to be created does not conflict with the original configuration of the network device, adaptability is verified successfully.

With respect to creation of the mapping relationship between the VNID and the network policy configuration information, for example, the network device may create a network policy list corresponding to the VNID, and add network configuration information of the virtual network to be created to the created network policy list corresponding to the VNID.

403. The network device receives an association or pre-association message sent by the server, where the association or pre-association message includes a VNID of a virtual machine to be created.

In an implementation of the present invention, when the server needs to create a virtual machine in the created virtual network, the server sends an association or pre-association message to the network device, where the association or pre-association message includes the VNID of the virtual machine to be created.

The association or pre-association message is a message for instructing the network device to associate or pre-associate the network policy configuration information corresponding to the VNID with the virtual machine to be created. For example, the association or pre-association message is specifically a Pre-Associate (Pre-Associate) message or an Associate (Associate) message in a new virtual machine discovery and configuration protocol (VDP), or a Flow Specification (Flow Specification) message in a new Border Gateway Protocol (BGP).

404. The network device performs, according to the VNID of the virtual machine to be created, association or pre-association processing for the virtual machine to be created and network policy configuration information corresponding to the VNID.

In a specific implementation, the network device, for example, may query, according to the VNID of the virtual machine to be created, whether a network policy list corresponding to the VNID exists locally; if the network policy list exists, the network may add, according to the pre-association message, an identifier of the virtual machine to be created to the network policy list corresponding to the VNID. In this case, the mapping relationship between the virtual machine to be created and the network policy configuration is in a disabled state. Alternatively, the network device may add, according to the association message, the identifier of the virtual machine to be created to the network policy list corresponding to the VNID, and enable the mapping relationship between the virtual machine to be created and the network policy configuration.

The network device in this embodiment is a network device communicatively connected to the virtual machine that belongs to the same virtual network, for example, a network device processing a message sent from or to a virtual machine that belongs to the same virtual network. The network device may be a network switch or a router.

Optionally, after the network device performs association or pre-association for the virtual machine to be created and network policy configuration information, the network device may send an association or pre-association success message to the server; if the network device verifies adaptability of the network policy configuration information unsuccessfully, the network device sends a configuration failure message to the server.

In the embodiment of the present invention, a network device receives a network policy synchronization message sent by a server, where the network policy synchronization message includes a VNID of a virtual network to be created and network policy configuration information corresponding to the virtual network to be created; the network device creates a mapping relationship between the VNID of the virtual network to be created and the network policy configuration information. Therefore, when the server creates multiple virtual machines in a virtual network having a same VNID, it is unnecessary to send the network policy configuration information corresponding to the VNID repeatedly to the network device for configuration, the server only needs to send an association or pre-association message to the network device, where the association or pre-association message includes a VNID of a virtual machine to be created, and the network device performs association or pre-association processing for the virtual machine to be created and network policy configuration information corresponding to the VNID. Consequently, processing overheads of the system can be reduced.

Meanwhile, in this embodiment, network policy configuration of the virtual machine VM can also be implemented without using a third-party device, for example, an nCenter and a vCenter, which not only simplifies the network architecture of the system, but also solves the problem of low network policy configuration efficiency caused by poor real-time performance of network policy configuration in the prior art, and improves network policy configuration efficiency.

Figure 5:
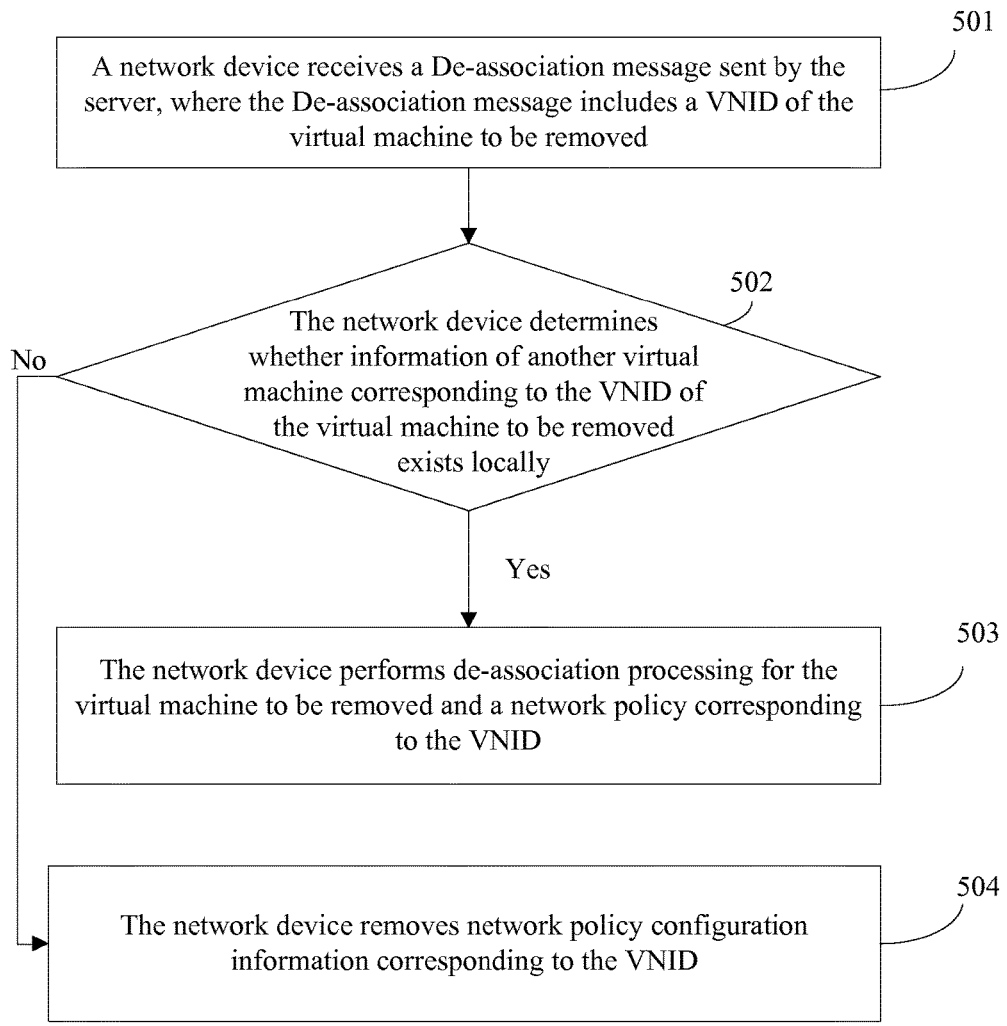
FIG. 5 is a schematic flowchart of a method for configuring a network policy of a virtual network according to another embodiment of the present invention.

FIG. 5 is a schematic flowchart of a method for configuring a network policy of a virtual network according to another embodiment of the present invention. On the basis of the embodiment shown in FIG. 4, when a server removes a created virtual machine, to release resources of a network device, the network device communicating with the virtual machine also needs to release network policy configuration related to the removed virtual machine. As shown in FIG. 5, the method for configuring a network policy of a virtual network in this embodiment further includes the following:

501. The network device receives a De-association message sent by the server, where the De-association message includes a VNID of the virtual machine to be removed.

In an implementation of the present invention, if the server determines that another virtual machine having the same VNID as the virtual machine to be removed exists locally, the server sends a De-association message to the network device communicating with the virtual machine to be removed, where the De-association message includes the VNID of the virtual machine to be removed.

The De-association (De-association) message is a message for instructing the network device to perform de-association processing for the virtual machine to be removed and a network policy corresponding to the VNID. For example, the De-association message specifically includes a De-associate (De-associate) message in a new VDP protocol or a Flow Specification (Flow Specification) message in a new BGP protocol, and so on.

502. The network device determines whether information of another virtual machine corresponding to the VNID of the virtual machine to be removed exists locally; and if determining that information of another virtual machine corresponding to the VNID of the virtual machine to be removed exists locally, executes step 503; or if determining that information of no other virtual machine corresponding to the VNID of the virtual machine to be removed exists locally, executes step 504.

For example, the network device may set a virtual machine information list having a same VNID, where information of multiple virtual machines may be set in the virtual machine information list. The network device may query, according to the VNID of the virtual machine to be removed, a virtual machine information list corresponding to the VNID of the virtual machine to be removed; and if the virtual machine information list includes information of multiple virtual machines, determine that information of another virtual machine corresponding to the VNID of the virtual machine to be removed exists locally.

503. The network device performs de-association processing for the virtual machine to be removed and the network policy corresponding to the VNID.

For example, the network device searches, according to the VNID, a network policy list corresponding to the VNID and removes an identifier of the virtual machine to be removed, from the network policy list corresponding to the VNID.

Optionally, the network device may send a de-association success message to the server after performing de-association processing for the virtual machine to be removed and the network policy corresponding to the VNID of the virtual machine to be removed.

504. The network device removes network policy configuration information corresponding to the VNID.

In another implementation of the present invention, the server sends a network policy removal synchronization message to the network device if the server determines that no other virtual machine having the same VNID as the virtual machine to be removed exists locally, where the network policy removal synchronization message includes the VNID of the virtual machine to be removed.

For example, the network device may remove, according to the VNID of the virtual machine to be removed which is included in the received network policy removal synchronization message, the network policy configuration information corresponding to the VNID and/or multicast address information corresponding to the VNID.

In the embodiment of the present invention, when a network device receives a De-association message sent by a virtual machine management center, where the De-association message includes a VNID of a virtual machine to be removed, the network device performs, according to the VNID of the virtual machine to be removed, de-association processing for the virtual machine to be removed and network policy configuration information corresponding to the VNID of the virtual machine to be removed. Therefore, the configured network policy configuration of the virtual machine VM can also be removed without using a third-party device, for example, an nCenter and a vCenter, which not only simplifies the network architecture of the system, but also solves the problem of low network policy configuration efficiency caused by poor real-time performance of network policy configuration in the prior art, and improves network policy configuration efficiency.

Figure 6:
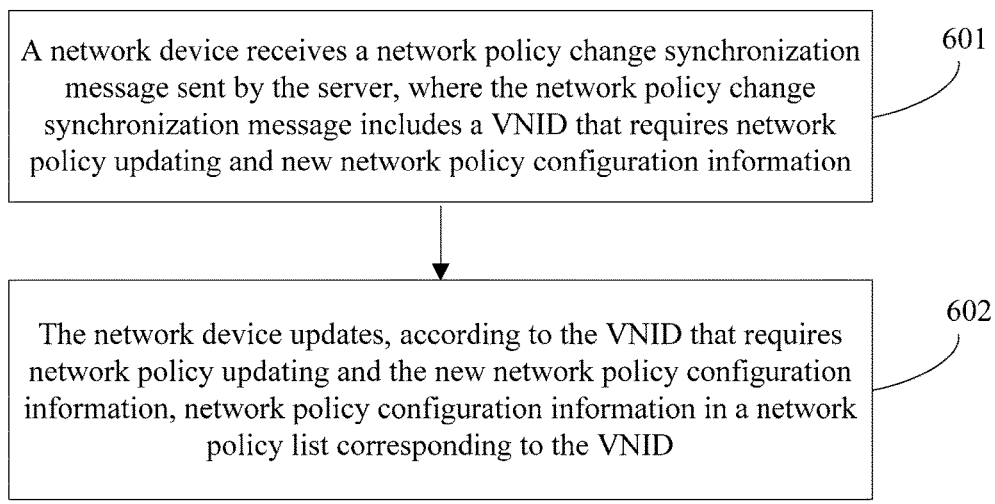
FIG. 6 is a schematic flowchart of a method for configuring a network policy of a virtual network according to another embodiment of the present invention.

FIG. 6 is a schematic flowchart of a method for configuring a network policy of a virtual network according to another embodiment of the present invention. On the basis of configuring a network policy for a newly created virtual machine in a network device by using the method of the embodiment shown in FIG. 4, when a virtual machine management center wants to change network policy configuration of the virtual machine, it is necessary to update network policy configuration information related to the virtual machine, where a specific implementation process is shown in FIG. 6, and the method for configuring a network policy of a virtual network in this embodiment further includes the following:

601. The network device receives a network policy change synchronization message sent by a server, where the network policy change synchronization message includes a VNID that requires network policy updating and new network policy configuration information.

It is assumed that the network running environment changes or that the quality of service or bandwidth of the virtual machine needs to be changed, for example, the virtual machine currently has no permission to access an external network, and the virtual machine management center vCenter sets an access permission for the virtual machine to access the external network, or for another example, the current network bandwidth of the virtual machine is 50M, and the virtual machine management center vCenter sets the network bandwidth of the virtual machine to 100M. In this case, it is necessary to modify the network policy configuration information of the virtual machine correspondingly. In a specific implementation, the network device receives the network policy change synchronization message sent by the server, where the network policy change synchronization message includes a VNID that requires network policy updating and new network policy configuration information.

The network policy change synchronization message is used to instruct the network device to update network policy configuration information in a network policy list corresponding to the VNID. For example, the network policy change synchronization message specifically includes a Pre-Associate message or an Associate message in a new VDP protocol or a Flow Specification (Flow Specification) message in a new BGP protocol, and so on.

602. The network device updates, according to the VNID that requires network policy updating and the new network policy configuration information, the network policy configuration information in the network policy list corresponding to the VNID.

In a specific implementation, the network device may query, according to the VNID that requires network policy updating, whether a network policy corresponding to the VNID exists locally; and if the network policy exists, update, according to the new network policy configuration information, the network policy configuration information in the network policy list corresponding to the VNID.

In the embodiment of the present invention, when a network device receives a network policy change synchronization message sent by a virtual machine management center, the network device queries, according to a VNID that requires network policy updating and is included in the network policy change synchronization message, whether a network policy list corresponding to the VNID exists locally, and if the network policy list exists, updates, according to new network policy configuration information, network policy configuration information in the network policy list corresponding to the VNID. Therefore, when there are multiple virtual machines having a same VNID, the network device does not need to repeatedly update a network policy corresponding to each virtual machine, and processing overheads of the system can be reduced.

Meanwhile, in this embodiment, the network device may update the network policy of the virtual machine without using a third-party device, for example, an nCenter and a vCenter, which not only simplifies the network architecture of the system, but also solves the problem of low network policy configuration efficiency caused by poor real-time performance of network policy configuration in the prior art, and improves network policy configuration efficiency.

Figure 7:
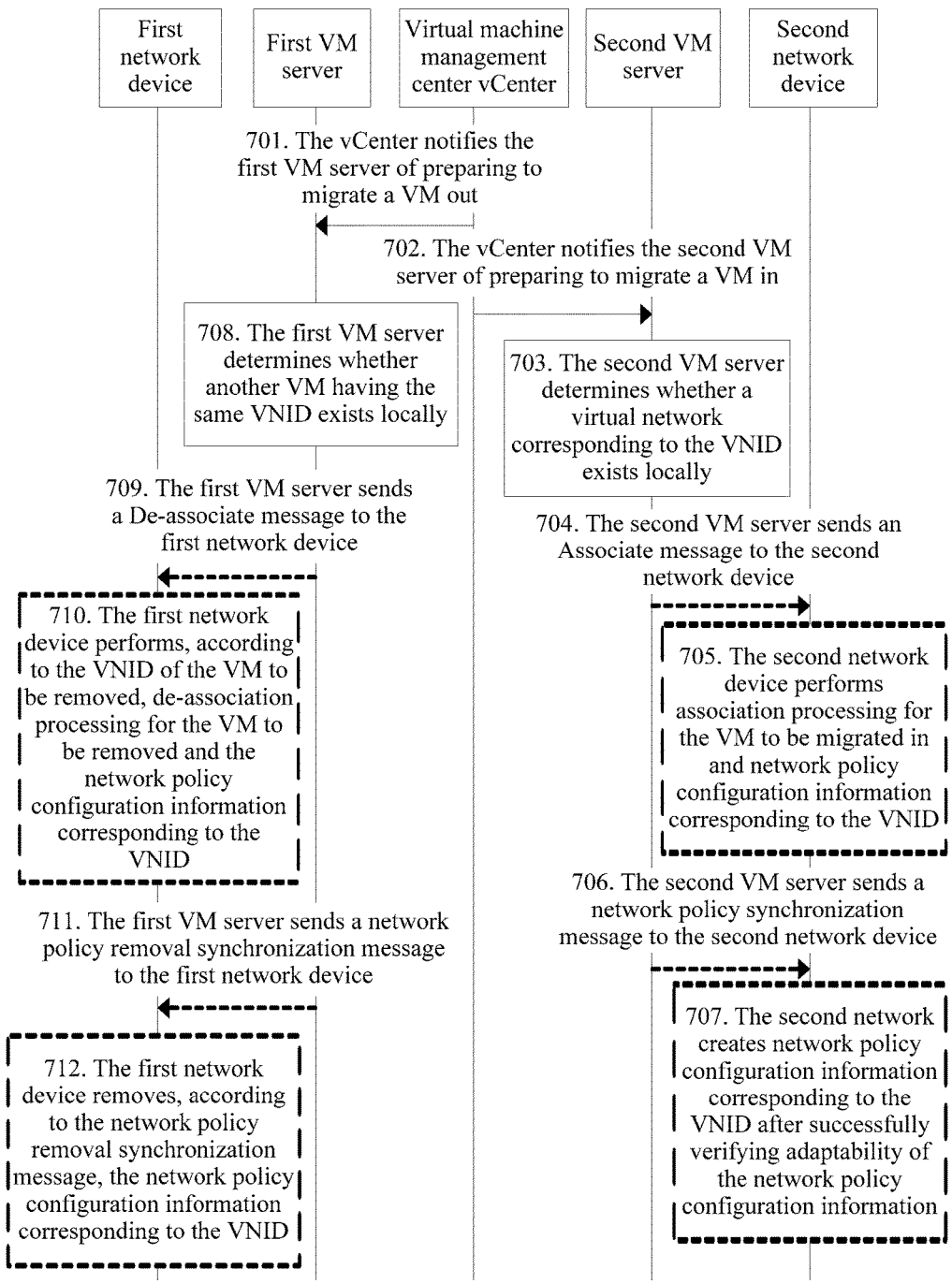
FIG. 7 is a signaling diagram of a method for configuring a network policy of a virtual network according to another embodiment of the present invention.

FIG. 7 is a message diagram of a method for configuring a network policy of a virtual network according to another embodiment of the present invention. When it is necessary to migrate a virtual machine VM from a first VM server to a second VM server, the process of configuring a network policy of a virtual machine in this embodiment is shown in FIG. 7 and includes the following:

701. A vCenter notifies the first VM server of preparing to migrate the VM out.

In a specific implementation, the vCenter sends the first VM server, through an application programming interface API, information about the VM to be migrated out, for example, the information about the VM to be migrated out includes a VNID and a VM address of the VM to be migrated out. The VM address may be a layer-3 network address, such as IPv4 or IPv6, or may be a layer-2 network address, such as a MAC address.

702. The vCenter notifies the second VM server of preparing to migrate the VM in.

In a specific implementation, the vCenter sends the second VM server, through the application programming interface API, information about the VM to be migrated in, where the information about the VM to be migrated in includes at least a VNID of the VM to be migrated in.

The VNID of the VM to be migrated in is the same as the VNID of the VM to be migrated out.

703. The second VM server determines whether a virtual network corresponding to the VNID exists locally, and if the virtual network exists, executes step 704, or otherwise, executes step 706.

704. The second VM server sends an Associate message to a second network device.

The Associate message includes the VNID of the VM to be migrated in.

705. The second network device performs association processing for the VM to be migrated in and network policy configuration information corresponding to the VNID.

Specifically, for example, the second network device queries, according to the VNID included in the Associate message, a network policy list corresponding to the VNID, adds an identifier of the VM to be migrated in to the network policy list corresponding to the VNID, and enables network policy configuration information of the VM to be migrated in.

Optionally, the second network device sends an association success message to the second VM server.

706. The second VM server sends a network policy synchronization message to the second network device.

The network policy synchronization message includes the VNID of the VM to be migrated in and corresponding network policy configuration information.

707. The second network device creates network policy configuration information corresponding to the VNID after successfully verifying adaptability of the network policy configuration information.

If none of attributes of the network policy configuration information conflicts with the original configuration of the second network device, and requested resource allocation can also be satisfied, it is deemed that verification succeeds, and the second network device creates a mapping relationship, for example, a network policy list corresponding to the VNID, between the VNID and the network policy configuration information according to the network policy configuration information included in the network policy synchronization message, and then adds the identifier of the VM to be migrated in to the network policy list corresponding to the VNID, and enables the network policy configuration information of the VM to be migrated in.

Optionally, the second network device sends an association success message to the second VM server.

The second network device is a network device communicating with the virtual network corresponding to the VNID, and the second network device includes a network switch or a router.

708. The first VM server determines whether another VM having the same VNID exists locally, and if yes, executes step 709, or otherwise, executes step 711.

709. The first VM server sends a De-associate message to a first network device.

The De-associate message includes a VNID of a VM to be removed.

The first network device is a network device communicating with the virtual network corresponding to the VNID, and the first network device includes a network switch or a router.

710. The first network device performs, according to the VNID of the VM to be removed, de-association processing for the VM to be removed and the network policy configuration information corresponding to the VNID.

For example, the first network device removes an identifier of the VM to be removed, from the network policy list corresponding to the VNID.

Optionally, the first network device returns a de-association success message to the first VM server.

711. The first VM server sends a network policy removal synchronization message to the first network device.

The network policy removal synchronization message includes the VNID of the virtual machine to be removed.

712. The first network device removes, according to the network policy removal synchronization message, the network policy configuration information corresponding to the VNID.

Optionally, the first network device returns a removal success message to the first VM server.

Steps 701 and 702 may be performed in parallel; steps 704 and 709 may be performed in parallel; steps 705 and 710 may be performed in parallel; steps 706 and 711 may be performed in parallel; and steps 707 and 712 may be performed in parallel.

In the above process, an Associate message is used as an example for carrying a VNID of a virtual machine, and the above method is also applicable to a Pre-Associate message.

In a virtual network, when a network policy of the virtual network changes, a method for resending an Associate message may be used, where the Associate message includes a VNID of the virtual network and new network policy configuration information, and a network device updates, according to the VNID and updated network policy configuration information, network policy configuration information corresponding to the VNID.

In the embodiment of the present invention, when a virtual machine VM is migrated, that is, migrated from a server to another server, whether a virtual network having a same VNID as the VM to be migrated in exists on the other server may be queried, and if yes, the other server sends an Associate message including the VNID to a network device so that the network device performs, according to the Associate message, association processing for the virtual machine to be created and network policy configuration information corresponding to the VNID. Therefore, the other server does not need to send the network policy configuration information repeatedly to the network device for configuration, and processing overheads of the system can be reduced.

A communication protocol of the association or pre-association message, De-association message, network policy synchronization message, network policy change synchronization message, and network policy removal synchronization message used in the above embodiments is a protocol that is capable of running between a server and a network device and carrying a VNID of a virtual machine, for example, including at least one of a new Border Gateway Protocol (BGP), or a new virtual machine discovery and configuration protocol (VDP), or a new link layer discovery protocol (LLDP), or a new extensible messaging and presence protocol (XMPP).

The following uses the new virtual machine discovery and configuration protocol VDP as an example to describe a message format of the new VDP in detail.

FIG. 11 is a schematic diagram of a message format of a new VDP applied in an embodiment of the present invention; FIG. 12 is a schematic diagram of a mapping relationship between a TLV type and a corresponding Value value in the message format of the VDP shown in FIG. 11; and FIG. 13 is a schematic diagram of a mapping relationship between a policy type Policy Type and a Value value of a corresponding TLV Type shown in FIG. 11.

The TLV is a type length value (Type Length Value), and the VSI is a virtual station instance (Virtual Station Instance).

As shown in FIG. 11, the field VSI Type ID is used to carry VNID information of the VSI, that is, the VSI Type ID is a VNID; and the network device may know the VNID of the corresponding VSI by reading the VSI Type ID field in a VDP message. The VSI Type ID field occupies 24 bits, and correspondingly supports at most 224 tenants; the VSI Type Version field occupies 8-bit space, and may be combined with the VSI Type ID to jointly indicate VNID information, and at most 232 tenants are supported after the combination.

As shown in FIG. 11, the field Policy Type is used to carry a network policy type, where different policy types Policy Types correspond to Value values of different TLV Types. In an actual application, the description about the field, selection of a value, expression of a format, splitting and combination of different types, and so on may be changed correspondingly according to actual requirements.

With respect to different policy types (Policy type), the Policy Info (Policy Info) field may be negotiated by a server and a network device, as long as the server and the network device are ensured to understand each other.

For example, when the Policy type is VN Policy, the Value value of the TLV Type corresponding to the VN Policy includes at least two fields, where one field is a virtual network identification (VNID) of a virtual machine VM, for example, an identification ID of a tenant, and the other field is a multicast address corresponding to the VNID, where the multicast address corresponding to the VNID is used to perform data multicast in a virtual network.

For example, when the Policy type is IGMP snooping or DHCP snooping, the Policy Info field may include information of two states: enabled or disabled.

As shown in FIG. 12, on the basis of an original definition, network policy synchronization Policy Sync, network policy update Policy Update, and network policy removal Policy Remove are added to the field TLV Type, where Policy Sync is used to carry a network policy synchronization message, Policy Update is used to carry a network policy change synchronization message, and Policy Remove is used to carry a network policy removal synchronization message. In an actual application, the description about the field, selection of a value, expression of a format, and splitting of different types may be changed correspondingly according to requirements.

As described above, an embodiment of the present invention may also use another protocol that is capable of running between a server and a network device and carrying network policy configuration information of a virtual machine, for example, a new BGP, XMPP, or LLDP protocol, or the like; the protocol, such as the new BGP, XMPP, or LLDP protocol, is different from the new VDP protocol mainly in the message format. For example, a Flow Specification (Flow Specification) message in the new BGP protocol may implement functions of pre-association or association messages and De-association messages in the embodiments of the present invention, where a VNID of the virtual machine and corresponding network policy configuration information may be carried in the Flow Specification (Flow Specification) message, and are sent to the network device by the server in a VSI synchronization process, so that the network device completes network policy configuration of the virtual machine.

In the embodiments of the present invention, there is at least one network device communicating with a virtual network. When there are multiple network devices communicating with the virtual network, a server may send a VNID of the virtual network to the network devices separately through an association or pre-association message, so that each network device receiving the association or pre-association message performs association or pre-association processing for multiple virtual machines belonging to the virtual network and network policy configuration information corresponding to the VNID; or the server may send a VNID of the virtual machine to the network devices separately through a De-association message, so that each network device receiving the De-association message de-associates a network policy related to the virtual machine.

A communication protocol used in the embodiments of the present invention, for example, a new VDP, BGP, XMPP, LLDP protocol, or the like, is used to carry a VNID of a virtual machine and may further carry information of the virtual machine and a multicast address of a virtual network corresponding to the VNID, which has obvious benefits for creating a virtual network of a data center.

Figure 8:
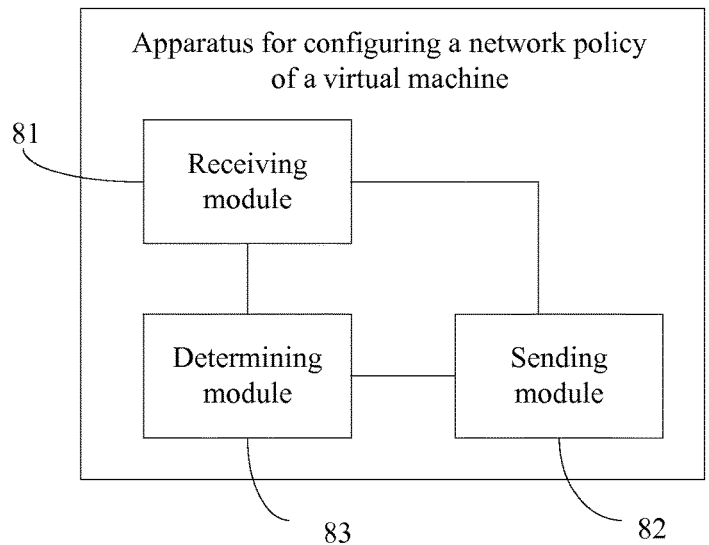
FIG. 8 is a schematic structural diagram of an apparatus for configuring a network policy of a virtual network according to another embodiment of the present invention.

FIG. 8 is a schematic structural diagram of an apparatus for configuring a network policy of a virtual network according to another embodiment of the present invention. As shown in FIG. 8, the apparatus for configuring a network policy of a virtual network may be, for example, a server, and specifically includes:

a receiving module 81, configured to receive a network policy message sent by a virtual machine management center and used for creating a virtual network, where the network policy message for creating a virtual network includes a virtual network identification VNID of a virtual network to be created and network policy configuration information corresponding to the virtual network to be created; and a sending module 82, configured to send a network policy synchronization message to a network device, where the network policy synchronization message includes the VNID of the virtual network to be created and the network policy configuration information corresponding to the virtual network to be created.

In a first possible implementation, the receiving module 81 is further configured to receive a virtual machine creation message sent by the virtual machine management center, where the virtual machine creation message includes a VNID of a virtual machine to be created; and the sending module 82 is further configured to send an association or pre-association message to the network device, where the association or pre-association message includes the VNID, so that the network device performs, according to the VNID, association or pre-association processing for the virtual machine to be created and network policy configuration information corresponding to the VNID.

In a second possible implementation, the receiving module 81 is further configured to receive a virtual machine removal message sent by the virtual machine management center, where the virtual machine removal message includes a VNID of a virtual machine to be removed; and the apparatus further includes:

a determining module 83, configured to determine that another virtual machine having the same VNID as the virtual machine to be removed exists locally on the server; where the sending module 82 is further configured to send a De-association message to the network device, where the De-association message includes the VNID of the virtual machine to be removed;

the determining module 83 is further configured to determine that no other virtual machine having the same VNID as the virtual machine to be removed exists locally on the server; and the sending module 82 is further configured to send a network policy removal synchronization message to the network device, where the network policy removal synchronization message includes the VNID of the virtual machine to be removed.

In a third possible implementation, the receiving module 81 is further configured to receive a network policy change message sent by the virtual machine management center, where the network policy change message includes a VNID that requires network policy updating and new network policy configuration information; and the sending module 82 is further configured to send a network policy change synchronization message to the network device, where the network policy change synchronization message includes the VNID that requires network policy updating and the new network policy configuration information.

A communication protocol of the association or pre-association message, De-association message, network policy synchronization message, network policy change synchronization message, and network policy removal synchronization message is a protocol that is capable of running between a server and a network device and carrying a VNID of a virtual machine, for example, including at least one of a new Border Gateway Protocol (BGP), or a new virtual machine discovery and configuration protocol (VDP), or a new link layer discovery protocol (LLDP), or a new extensible messaging and presence protocol (XMPP).

In the present invention, a server receives a network policy message sent by a virtual machine management center and used for creating a virtual network, where the network policy message for creating a virtual network includes a virtual network identification VNID of a virtual network to be created and network policy configuration information corresponding to the virtual network to be created; the server sends a network policy synchronization message to a network device, where the network policy synchronization message includes the VNID of the virtual network to be created and the network policy configuration information corresponding to the virtual network to be created, so that the network device creates a mapping relationship between the VNID of the virtual network to be created and the network policy configuration information. Therefore, when there are multiple virtual machines having a same VNID, it is unnecessary to send the network policy configuration information corresponding to the VNID repeatedly to the network device for configuration, and the server only needs to send an association or pre-association message to the network device, where the association or pre-association message includes a VNID of a virtual machine to be created, so that the network device performs association or pre-association processing for the virtual machine to be created and network policy configuration information corresponding to the VNID. Consequently, processing overheads of the system can be reduced.

Figure 9:
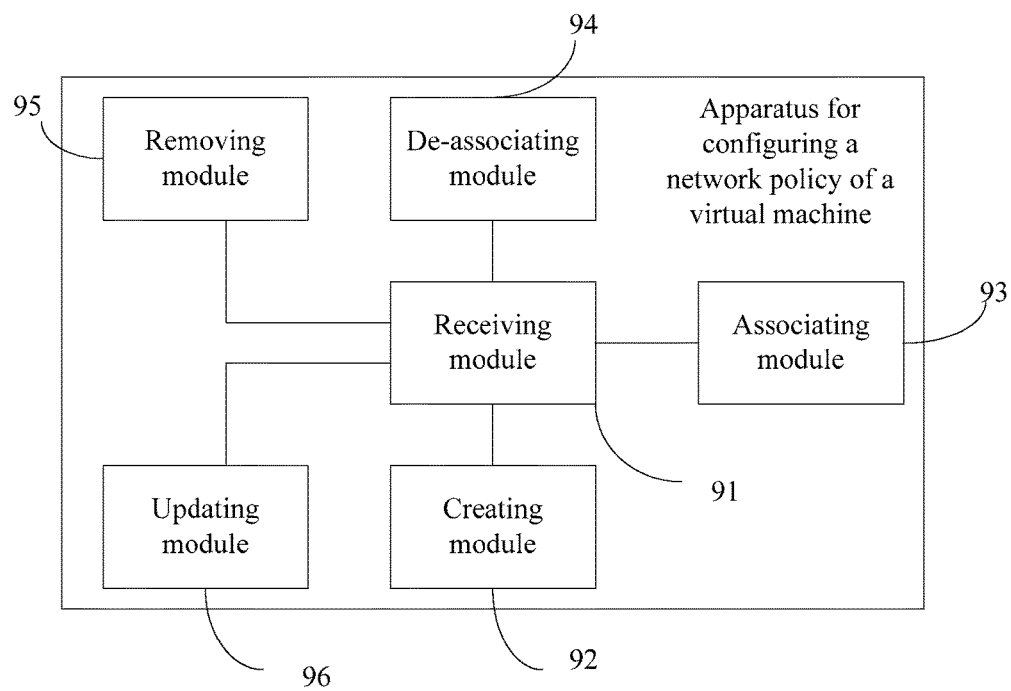
FIG. 9 is a schematic structural diagram of an apparatus for configuring a network policy of a virtual network according to another embodiment of the present invention.

FIG. 9 is a schematic structural diagram of an apparatus for configuring a network policy of a virtual network according to another embodiment of the present invention. As shown in FIG. 9, the apparatus for configuring a network policy of a virtual network may be, for example, a network device, and specifically includes:

a receiving module 91, configured to receive a network policy synchronization message sent by a server, where the network policy synchronization message includes a VNID of a virtual network to be created and network policy configuration information corresponding to the virtual network to be created; and a creating module 92, configured to create a mapping relationship between the VNID and the network policy configuration information on a basis that adaptability of the network policy configuration information is verified successfully.

In a first possible implementation, the receiving module 91 is further configured to receive an association or pre-association message sent by the server, where the association or pre-association message includes a VNID of a virtual machine to be created; and the apparatus further includes:

an associating module 93, configured to perform, according to the VNID of the virtual machine to be created, association or pre-association processing for the virtual machine to be created and network policy configuration information corresponding to the VNID.

In a second possible implementation, the receiving module 91 is further configured to receive a De-association message sent by the server, where the De-association message includes a VNID of the virtual machine to be removed; and the apparatus further includes:

a de-associating module 94, configured to perform, according to the VNID of the virtual machine to be removed, de-association processing for the virtual machine to be removed and a network policy corresponding to the VNID of the virtual machine to be removed, if it is determined that information of another virtual machine corresponding to the VNID of the virtual machine to be removed exists locally; and a removing module 95, configured to remove, according to the VNID of the virtual machine to be removed, network policy configuration information corresponding to the VNID, if it is determined that information of no other virtual machine corresponding to the VNID of the virtual machine to be removed exists locally.

In a third possible implementation, the receiving module 91 is further configured to receive a network policy removal synchronization message sent by the server, where the network policy removal synchronization message includes a VNID that requires removal of network policy configuration information; and the removing module 95 is further configured to remove, according to the network policy removal synchronization message, network policy configuration information corresponding to the VNID.

In a fourth possible implementation, the receiving module 91 is further configured to receive a network policy change synchronization message sent by the server, where the network policy change synchronization message includes a VNID that requires network policy updating and new network policy configuration information; and the apparatus further includes:

an updating module 96, configured to update, according to the new network policy configuration information, network policy configuration information corresponding to the VNID.

A communication protocol of the association or pre-association message, De-association message, network policy synchronization message, network policy change synchronization message, and network policy removal synchronization message is a protocol that is capable of running between a server and a network device and carrying a VNID of a virtual machine, for example, including at least one of a new Border Gateway Protocol (BGP), or a new virtual machine discovery and configuration protocol (VDP), or a new link layer discovery protocol (LLDP), or a new extensible messaging and presence protocol (XMPP).

In the embodiment of the present invention, a network device receives a network policy synchronization message sent by a server, where the network policy synchronization message includes a VNID of the virtual network to be created and network policy configuration information corresponding to the virtual network to be created; the network device creates a mapping relationship between the VNID of the virtual network to be created and the network policy configuration information. Therefore, when the server creates multiple virtual machines in a virtual network having a same VNID, it is unnecessary to send the network policy configuration information corresponding to the VNID repeatedly to the network device for configuration, the server only needs to send an association or pre-association message to the network device, where the association or pre-association message includes a VNID of a virtual machine to be created, and the network device performs association or pre-association processing for the virtual machine to be created and network policy configuration information corresponding to the VNID. Consequently, processing overheads of the system can be reduced.

FIG. 10 is a schematic structural diagram of a system for configuring a network policy of a virtual network according to another embodiment of the present invention. As shown in FIG. 10, the system includes the apparatus for configuring a network policy of a virtual network according to the embodiment corresponding to FIG. 8, which may specifically be a server 11, and further includes the apparatus for configuring a network policy of a virtual network according to the embodiment corresponding to FIG. 9, which may specifically be a network device 12.

For detailed description about the server 11, reference may be made to related content in the embodiment corresponding to FIG. 8; for detailed description about the network device 12, reference may be made to related content in the embodiment corresponding to FIG. 9. Details are not described herein.

The network device 12 is a network device communicating with a VM in the server 11, for example, a network device processing a message sent from or to the VM, and the network device 12 includes a network switch or a router.

In an implementation of the present invention, the system further includes:

a virtual machine management center 13, configured to send a network policy message for creating a virtual network to a server, where the network policy message for creating a virtual network includes a VNID of a virtual network to be created and corresponding network policy configuration information, so that the server sends a network policy synchronization message to the network device, where the network policy synchronization message includes the VNID of the virtual network to be created and the corresponding network policy configuration information.

The virtual machine management center 13 is further configured to send a virtual machine creation message to the server, where the virtual machine creation message includes a VNID of a virtual machine to be created, so that the server sends an association or pre-association message to the network device, where the association or pre-association message includes the VNID of the virtual machine to be created.

The virtual machine management center 13 is further configured to send a virtual machine removal message to the server, where the virtual machine removal message includes a VNID of a virtual machine to be removed, so that the server sends a De-association message or network policy removal synchronization message including the VNID of the virtual machine to be removed to a network device communicating with the virtual machine.

The virtual machine management center 13 is further configured to send a network policy change message to the server, where the network policy change message includes a VNID of a virtual machine that requires network policy updating and corresponding network policy configuration information that requires to be updated, so that the server sends a network policy change synchronization message including the VNID of the virtual machine that requires network policy updating and the corresponding network policy configuration information that requires to be updated to a network device communicating with the virtual machine.

In the present invention, a server receives a network policy message sent by a virtual machine management center and used for creating a virtual network, where the network policy message for creating a virtual network includes a virtual network identification VNID of a virtual network to be created and network policy configuration information corresponding to the virtual network to be created; the server sends a network policy synchronization message to a network device, where the network policy synchronization message includes the VNID of the virtual network to be created and the network policy configuration information corresponding to the virtual network to be created, so that the network device creates a mapping relationship between the VNID of the virtual network to be created and the network policy configuration information. Therefore, when there are multiple virtual machines having a same VNID, it is unnecessary to send the network policy configuration information corresponding to the VNID repeatedly to the network device for configuration, and the server only needs to send an association or pre-association message to the network device, where the association or pre-association message includes a VNID of a virtual machine to be created, so that the network device performs association or pre-association processing for the virtual machine to be created and network policy configuration information corresponding to the VNID. Consequently, processing overheads of the system can be reduced.

Another embodiment of the present invention further provides an apparatus for configuring a network policy of a virtual network, where the apparatus may specifically be a server. The server includes a processor, and when the processor runs, the processor may execute the following steps:

receiving a network policy message sent by a virtual machine management center and used for creating a virtual network, where the network policy message for creating a virtual network includes a virtual network identification VNID of a virtual network to be created and network policy configuration information corresponding to the virtual network to be created; and sending a network policy synchronization message to a network device, where the network policy synchronization message includes the VNID of the virtual network to be created and the network policy configuration information corresponding to the virtual network to be created.

Based on a first aspect, in a first possible implementation, after sending the network policy synchronization message to the network device, the method includes:

receiving a virtual machine creation message sent by the virtual machine management center, where the virtual machine creation message includes a VNID of a virtual machine to be created; and sending an association or pre-association message to the network device, where the association or pre-association message includes the VNID, so that the network device performs, according to the VNID, association or pre-association processing for the virtual machine to be created and network policy configuration information corresponding to the VNID.

Based on the first possible implementation of the first aspect, in a second possible implementation, the method further includes:

receiving a virtual machine removal message sent by the virtual machine management center, where the virtual machine removal message includes a VNID of a virtual machine to be removed; and sending a De-association message to the network device if determining that another virtual machine having the same VNID as the virtual machine to be removed exists locally, where the De-association message includes the VNID of the virtual machine to be removed, so that the network device performs, according to the VNID, de-association processing for the virtual machine to be removed and network policy configuration information corresponding to the VNID; or sending a network policy removal synchronization message to the network device if determining that no other virtual machine having the same VNID as the virtual machine to be removed exists locally, where the network policy removal synchronization message includes the VNID of the virtual machine to be removed, so that the network device removes the network policy configuration information corresponding to the VNID.

Based on the first possible implementation of the first aspect, in a third possible implementation, the method further includes:

receiving a network policy change message sent by the virtual machine management center, where the network policy change message includes a VNID that requires network policy updating and new network policy configuration information; and sending a network policy change synchronization message to the network device, where the network policy change synchronization message includes the VNID that requires network policy updating and the new network policy configuration information.

A communication protocol of the association or pre-association message, De-association message, network policy synchronization message, network policy change synchronization message, and network policy removal synchronization message is a protocol that is capable of running between a server and a network device and carrying a VNID of a virtual machine, for example, including at least one of a new Border Gateway Protocol (BGP), or a new virtual machine discovery and configuration protocol (VDP), or a new link layer discovery protocol (LLDP), or a new extensible messaging and presence protocol (XMPP).

Specifically, the server further includes components such as a memory, a bus, and a hard disk, in addition to the processor, where the processor is connected to the memory and the hard disk through the bus.

In the present invention, a server receives a network policy message sent by a virtual machine management center and used for creating a virtual network, where the network policy message for creating a virtual network includes a virtual network identification VNID of a virtual network to be created and network policy configuration information corresponding to the virtual network to be created; the server sends a network policy synchronization message to a network device, where the network policy synchronization message includes the VNID of the virtual network to be created and the network policy configuration information corresponding to the virtual network to be created, so that the network device creates a mapping relationship between the VNID of the virtual network to be created and the network policy configuration information. Therefore, when there are multiple virtual machines having a same VNID, it is unnecessary to send the network policy configuration information corresponding to the VNID repeatedly to the network device for configuration, and the server only needs to send an association or pre-association message to the network device, where the association or pre-association message includes a VNID of a virtual machine to be created, so that the network device performs association or pre-association processing for the virtual machine to be created and network policy configuration information corresponding to the VNID. Consequently, processing overheads of the system can be reduced.

Another embodiment of the present invention further provides an apparatus for configuring a network policy of a virtual network, where the apparatus may specifically be a network device. The network device includes a processor, and when the processor runs, the processor may execute the following steps:

receiving a network policy synchronization message sent by a server, where the network policy synchronization message includes a VNID of a virtual network to be created and network policy configuration information corresponding to the virtual network to be created; and creating a mapping relationship between the VNID and the network policy configuration information on a basis that adaptability of the network policy configuration information is verified successfully.

Based on a second aspect, in a first possible implementation, after creating the mapping relationship between the VNID and the network policy configuration information, the method includes:

receiving an association or pre-association message sent by the server, where the association or pre-association message includes a VNID of a virtual machine to be created; and performing, according to the VNID of the virtual machine to be created, association or pre-association processing for the virtual machine to be created and network policy configuration information corresponding to the VNID.

Based on the first possible implementation of the first aspect, in a second possible implementation, after creating the mapping relationship between the VNID and the network policy configuration information, the method further includes:

receiving a De-association message sent by the server, where the De-association message includes a VNID of a virtual machine to be removed; and if it is determined that information of another virtual machine corresponding to the VNID of the virtual machine to be removed exists locally, performing, according to the VNID of the virtual machine to be removed, de-association processing for the virtual machine to be removed and network policy configuration information corresponding to the VNID; or if it is determined that information of no other virtual machine corresponding to the VNID of the virtual machine to be removed exists locally, removing the network policy configuration information corresponding to the VNID.

Based on the first possible implementation of the first aspect, in a third possible implementation, after creating the mapping relationship between the VNID and the network policy configuration information, the method further includes:

receiving a network policy removal synchronization message sent by the server, where the network policy removal synchronization message includes a VNID that requires removal of network policy configuration information; and removing network policy configuration information corresponding to the VNID.

Based on the first possible implementation of the first aspect, in a fourth possible implementation, after creating the mapping relationship between the VNID and the network policy configuration information, the method further includes:

receiving a network policy change synchronization message sent by the server, where the network policy change synchronization message includes a VNID that requires network policy updating and new network policy configuration information; and updating, according to the new network policy configuration information, network policy configuration information corresponding to the VNID.

A communication protocol of the association or pre-association message, De-association message, network policy synchronization message, network policy change synchronization message, and network policy removal synchronization message is a protocol that is capable of running between a server and a network device and carrying a VNID of a virtual machine, for example, including at least one of a new Border Gateway Protocol (BGP), or a new virtual machine discovery and configuration protocol (VDP), or a new link layer discovery protocol (LLDP), or a new extensible messaging and presence protocol (XMPP).

Specifically, the network device further includes components such as a memory, a bus, and a hard disk, in addition to the processor, where the processor is connected to the memory and the hard disk through the bus.

In the embodiment of the present invention, a network device receives a network policy synchronization message sent by a server, where the network policy synchronization message includes a VNID of the virtual network to be created and network policy configuration information corresponding to the virtual network to be created; the network device creates a mapping relationship between the VNID of the virtual network to be created and the network policy configuration information. Therefore, when the server creates multiple virtual machines in a virtual network having a same VNID, it is unnecessary to send the network policy configuration information corresponding to the VNID repeatedly to the network device for configuration, the server only needs to send an association or pre-association message to the network device, where the association or pre-association message includes a VNID of a virtual machine to be created, and the network device performs association or pre-association processing for the virtual machine to be created and network policy configuration information corresponding to the VNID. Consequently, processing overheads of the system can be reduced.

It may be clearly understood by those skilled in the art that, for the purpose of convenient and brief description, for a detailed working process of the foregoing system, apparatus, and unit, reference may be made to a corresponding process in the foregoing method embodiments, and details are not described herein.

It is understandable that in the embodiments of the present invention, the disclosed system, apparatus, and method may be implemented in other ways. For example, the described apparatus embodiment is merely exemplary. For example, the unit division is merely logical function division and may be other division in an actual implementation. For example, a plurality of units or components may be combined or integrated into another system, or some features may be ignored or not executed. In addition, the displayed or discussed mutual couplings or direct couplings or communication connections may be implemented through some interfaces. The indirect couplings or communication connections between the apparatuses or units may be implemented in electronic, mechanical or other forms.

The units described as separate components may or may not be physically separate, and components displayed as units may or may not be physical units, may be located in one position, or may be distributed on a plurality of network units. A part or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in the form of hardware or a software functional unit in addition to hardware.

The integrated unit implemented in the form of a software functional unit may be stored in a computer readable storage medium in the form of codes. The codes are stored in a computer readable storage medium, and include a number of instructions that enable a processor or a hardware circuit to execute all or a part of steps of the methods provided in the embodiments of the present invention. The storage medium may be any medium capable of storing program codes, such as a high-capacity miniature removable storage disk having a universal serial bus interface without a physical drive, a removable hard disk, a read only memory (Read-Only Memory, ROM), a random access memory (Random Access Memory, RAM), a magnetic disk, or a CD-ROM.

Finally, it should be noted that the above embodiments are used only to describe the technical solutions of the present invention instead of limiting the present invention. Although the present invention is described in detail with reference to the foregoing embodiments, a person of ordinary skill in the art should understand that they can still make modifications to the technical solutions described in the foregoing embodiments or make equivalent substitutions to some technical features thereof without departing from the scope of the technical solutions of the embodiments of the present invention.

What is claimed is:

1. A method for configuring a network policy of a virtual network, comprising:
   receiving, by a server, a network policy message sent by a virtual machine management center and used for creating a virtual network, wherein the network policy message for creating the virtual network comprises a virtual network identification (VNID) of a virtual network to be created and network policy configuration information corresponding to the virtual network to be created, and the virtual network to be created is identified by the VNID in the network policy message;
   sending, by the server, a network policy synchronization message to a network device, wherein the network policy synchronization message comprises the VNID of the virtual network to be created and the network policy configuration information corresponding to the virtual network to be created;
   receiving, by the server, a virtual machine creation message sent by the virtual machine management center, wherein the virtual machine creation message comprises a VNID of a virtual machine to be created on the server; and
   sending, by the server, an association or pre-association message to the network device, wherein the association or pre-association message comprises the VNID of the virtual machine to be created, so that the network device performs, according to the VNID of the virtual machine to be created, association or pre-association processing for the virtual machine to be created and network policy configuration information corresponding to the VNID of the virtual machine to be created,
   wherein the virtual machine to be created is one of multiple virtual machines belonging to a virtual network identified by the VNID of the virtual machine to be created, and each of the multiple virtual machines belonging to the virtual network corresponds to the network policy configuration information according to the VNID of the virtual network to be created.

2. The method according to claim 1, further comprising:
   receiving, by the server, a virtual machine removal message sent by the virtual machine management center, wherein the virtual machine removal message comprises a VNID of a virtual machine to be removed; and
   sending, by the server, a de-association message to the network device if the server determines that another virtual machine having the same VNID as the virtual machine to be removed exists locally, wherein the de-association message comprises the VNID of the virtual machine to be removed, so that the network device performs, according to the VNID, de-association processing for the virtual machine to be removed and network policy configuration information corresponding to the VNID of the virtual machine to be removed.

3. The method according to claim 1, further comprising:
   receiving, by the server, a network policy change message sent by the virtual machine management center, wherein the network policy change message comprises a VNID that requires network policy updating and new network policy configuration information; and
   sending, by the server, a network policy change synchronization message to the network device, wherein the network policy change synchronization message comprises the VNID that requires network policy updating and the new network policy configuration information.

4. The method according to claim 1, further comprising:
   receiving, by the server, a virtual machine removal message sent by the virtual machine management center, wherein the virtual machine removal message comprises a VNID of a virtual machine to be removed; and
   sending, by the server, a network policy removal synchronization message to the network device if the server determines that no other virtual machine having the same VNID as the virtual machine to be removed exists locally, wherein the network policy removal synchronization message comprises the VNID of the virtual machine to be removed, so that the network device removes the network policy configuration information corresponding to the VNID of the virtual machine to be removed.

5. A method for configuring a network policy of a virtual network, comprising:
receiving, by a network device, a network policy synchronization message sent by a server, wherein the network policy synchronization message comprises a virtual network identification (VNID) of a virtual network to be created and network policy configuration information corresponding to the virtual network to be created, and the virtual network to be created is identified by the VNID in the network policy synchronization message; and
creating, by the network device, a mapping relationship between the VNID of the virtual network and the network policy configuration information;
receiving, by the network device, an association or pre-association message sent by the server, wherein the association or pre-association message comprises a VNID of a virtual machine to be created on the server; and
performing, according to the VNID of the virtual machine to be created, association or pre-association processing for the virtual machine to be created and network policy configuration information corresponding to the VNID of the virtual machine to be created;
wherein the virtual machine to be created is one of multiple virtual machines belonging to a virtual network identified by the VNID of the virtual machine to be created, and each of the multiple virtual machines belonging to the virtual network corresponds to the network policy configuration information according to the VNID of the virtual network to be created.

6. The method according to claim 5, wherein after creating the mapping relationship between the VNID and the network policy configuration information, the method further comprises:
receiving, by the network device, a de-association message sent by the server, wherein the de-association message comprises a VNID of a virtual machine to be removed; and
if it is determined that information of another virtual machine belonging to a virtual network identified by the VNID of the virtual machine to be removed exists locally, performing, by the network device according to the VNID of the virtual machine to be removed, de-association processing for the virtual machine to be removed and network policy configuration information corresponding to the VNID.

7. The method according to claim 5, wherein after creating the mapping relationship between the VNID and the network policy configuration information, the method further comprises:
receiving, by the network device, a network policy removal synchronization message sent by the server, wherein the network policy removal synchronization message comprises a VNID that requires removal of network policy configuration information; and
removing, by the network device, network policy configuration information corresponding to the VNID that requires removal of network policy configuration information.

8. The method according to claim 5, wherein after creating the mapping relationship between the VNID and the network policy configuration information, the method further comprises:
receiving, by the network device, a network policy change synchronization message sent by the server, wherein the network policy change synchronization message comprises a VNID that requires network policy updating and new network policy configuration information; and
updating, by the network device according to the new network policy configuration information, network policy configuration information corresponding to the VNID that requires network policy updating.

9. The method according to claim 5, wherein after creating the mapping relationship between the VNID and the network policy configuration information, the method further comprises:
receiving, by the network device, a de-association message sent by the server, wherein the de-association message comprises a VNID of a virtual machine to be removed; and
if it is determined that information of no other virtual machine belonging to a virtual network identified by the VNID of the virtual machine to be removed exists locally, removing the network policy configuration information corresponding to the VNID.

10. A server for configuring a network policy of a virtual network, comprising a processor and a memory storing instructions, wherein the processor is connected to the memory, and the processor is configured to execute the instructions to:
receive a network policy message sent by a virtual machine management center and used for creating a virtual network, wherein the network policy message for creating a virtual network comprises a virtual network identification (VNID) of a virtual network to be created and network policy configuration information corresponding to the virtual network to be created, and the virtual network to be created is identified by the VNID in the network policy message;
send a network policy synchronization message to a network device, wherein the network policy synchronization message comprises the VNID of the virtual network to be created and the network policy configuration information corresponding to the virtual network to be created;
receive a virtual machine creation message sent by the virtual machine management center, wherein the virtual machine creation message comprises a VNID of a virtual machine to be created on the server; and
send an association or pre-association message to the network device, wherein the association or pre-association message comprises the VNID of the virtual machine to be created, so that the network device performs, according to the VNID of the virtual machine to be created, association or pre-association processing for the virtual machine to be created and network policy configuration information corresponding to the VNID of the virtual machine to be created,
wherein the virtual machine to be created is one of multiple virtual machines belonging to a virtual network identified by the VNID of the virtual machine to be created, and each of the multiple virtual machines belonging to the virtual network corresponds to the network policy configuration information according to the VNID of the virtual network to be created.

11. The server according to claim 10, wherein the processor is further configured to:
- receive a virtual machine removal message sent by the virtual machine management center, and the virtual machine removal message comprises a VNID of a virtual machine to be removed; and
- in response to determining that another virtual machine having the same VNID as the virtual machine to be removed exists locally on the server, send a de-association message to the network device, wherein the de-association message comprises the VNID of the virtual machine to be removed.

12. The server according to claim 10, wherein the processor is further configured to:
- receive a network policy change message sent by the virtual machine management center, and the network policy change message comprises a VNID that requires network policy updating and new network policy configuration information; and
- send a network policy change synchronization message to the network device, wherein the network policy change synchronization message comprises the VNID that requires network policy updating and the new network policy configuration information.

13. The server according to claim 10, wherein the processor is further configured to:
- receive a virtual machine removal message sent by the virtual machine management center, and the virtual machine removal message comprises a VNID of a virtual machine to be removed; and
- in response to determining that no other virtual machine having the same VNID as the virtual machine to be removed exists locally on the server, send a network policy removal synchronization message to the network device, wherein the network policy removal synchronization message comprises the VNID of the virtual machine to be removed.

* * * * *